United States Patent [19]

Larson

[11] Patent Number: 5,133,437
[45] Date of Patent: Jul. 28, 1992

[54] WRAP SPRING CLUTCH WITH BRAKE

[75] Inventor: George D. Larson, Minneapolis, Minn.

[73] Assignee: Reell Precision Manufacturing, St. Paul, Minn.

[21] Appl. No.: 646,918

[22] Filed: Jan. 28, 1991

[51] Int. Cl.⁵ .............................................. F16D 27/10
[52] U.S. Cl. ............................... 192/12 BA; 192/81 C
[58] Field of Search ............... 192/12 BA, 41 S, 81 C, 192/84 T

[56] References Cited

U.S. PATENT DOCUMENTS

| | | | |
|---|---|---|---|
| 2,652,134 | 9/1953 | Montooth | 192/17 D |
| 3,185,276 | 5/1965 | Sajovec | 192/84 T |
| 3,186,530 | 6/1965 | Petroff | 192/81 C |
| 3,559,781 | 2/1971 | Brunelle | 192/12 BA |
| 3,926,286 | 12/1975 | Johnson | 192/41 S |
| 3,966,024 | 6/1976 | Baer | 192/12 BA X |
| 4,030,584 | 6/1977 | Lowery et al. | 192/84 T |
| 4,189,039 | 4/1980 | Johnson | 192/26 |
| 4,263,995 | 4/1981 | Wahlstedt | 192/84 T X |
| 4,273,226 | 6/1981 | Takefuta et al. | 192/84 T X |
| 4,321,992 | 3/1982 | Gallo | 192/81 C |
| 4,418,811 | 12/1983 | Mac Donald | 192/81 C |
| 4,638,899 | 1/1987 | Kossett | 192/81 C |
| 4,664,238 | 5/1987 | Nishino et al. | 192/84 C |
| 4,846,324 | 7/1989 | Ohsawa | 192/81 C X |

Primary Examiner—Leslie A. Braun
Assistant Examiner—Nicholas Whitelaw
Attorney, Agent, or Firm—Merchant, Gould, Smith, Edell, Welter & Schmidt

[57] ABSTRACT

A self-braking electromagnetic wrap spring clutch having a wrap spring control ring and a brake control armature plate at separate locations within a common magnetic circuit. The self-braking electromagnetic clutch includes: a shaft, a driving hub rotatable on said shaft and carrying a wrap spring and a control ring, a driven hub attached to said shaft, a shoulder assembly directly axially adjacent to said control ring extending radially from and rotatable with the driven hub and having ferromagnetic radially inner and outer annular segments separated by a binder having a sufficiently low magnetic permeance in relation to the inner and outer segments to create a magnetic permeance discontinuity therebetween, an armature plate adjacent to the shoulder assembly and being axially slidable toward and away from the shoulder assembly, a non-rotatable friction plate axially adjacent to the armature plate, biasing means for biasing the armature plate into frictional contact with the friction plate, and non-rotatable magnetic circuit body means for directing magnetic flux simultaneously between the control ring and the shoulder assembly and between the armature plate and the shoulder assembly.

15 Claims, 2 Drawing Sheets

WRAP SPRING CLUTCH WITH BRAKE

FIELD OF THE INVENTION

This invention relates to electromagnetically controlled wrap spring clutches which embody braking means. Such devices are useful as components of paper feed devices for office copying machines. The clutch accurately controls the feeding mechanism; the brake effectively overcomes any tendency toward reversal or overdrive, e.g. as caused by inertia of the load or friction in the drive mechanism.

BACKGROUND OF THE INVENTION

Combinations of wrap spring clutch and brake mechanisms have been described, together with some of their advantages. U.S. Pat. Nos. 2,652,134 and 3,186,530 describe mechanically actuated devices. U.S. Pat. No. 3,315,773 combines an electromagnetically actuated wrap spring clutch with a permanently actuated slip clutch or brake. In U.S. Pat. No. 3,966,024 a disc brake and wrap spring clutch act together in decelerating and stopping a rotating device.

The electromagnetically actuated clutch of U.S. Pat. No. 4,664,238 used opposing friction surfaces rather than a wrap spring. A similar electromagnetic actuating system appears in U.S. Pat. No. 4,273,226. The magnetic flux flows in two parallel paths through a first coupling member having an intervening air gap or other nonferromagnetic spacing between the paths, and to a second coupling member which is thereby magnetically drawn to and held in contact with the first member.

A wrap spring clutch mechanism is disclosed by Wahlstedt (U.S. Pat. No. 4,263,995). A wrap spring is caused to wrap down onto input and output hubs by a magnetic flux acting between a control ring and an adjacent shoulder ring affixed to the output hub and forming a section of the flux path. The remaining sections defining the flux path and enclosing the electromagnetic coil are fixed in position, only the two rings being rotatable.

SUMMARY OF THE INVENTION

The present invention provides a self-braking clutch which is a modified Wahlstedt clutch including a friction brake assembly. Electromagnetic actuation of the clutch automatically releases the brake. On deactuation of the clutch, the brake is automatically applied. These effects are achieved by including a spring-biased brake member as a separate component of the flux path. A preferred embodiment of the present invention provides a self-braking electromagnetic wrap spring clutch having a wrap spring control ring and a brake control armature plate at separate locations within a common magnetic circuit. A specific embodiment of the self-braking electromagnetic clutch includes a shaft, a driving hub rotatable on the shaft and carrying a wrap spring and a control ring, a driven hub attached to the shaft, a shoulder assembly directly axially adjacent to the control ring extending radially from and rotatable with the driven hub and having ferromagnetic radially inner and outer annular segments separated by binder means having a sufficiently low magnetic permeance in relation to the inner and outer segments to create a magnetic permeance discontinuity therebetween, an armature plate adjacent to the shoulder assembly and being axially slidable toward and away from the shoulder assembly, a non-rotatable friction plate axially adjacent to the armature plate, biasing means for biasing the armature plate into frictional contact with the friction plate, and non-rotatable magnetic circuit body means for directing magnetic flux simultaneously between the control ring and the shoulder assembly and between the armature plate and the shoulder assembly.

An advantage of the present invention is that a single magnetic flux circuit is used to simultaneously actuate a wrap spring clutch mechanism to rotationally drive the output hub and the shaft and deactuate a brake mechanism to free the shaft from a friction type braking action which otherwise prevents the shaft from rotating in respect to the housing. When the magnetic flux is shut off, the clutch mechanism releases the output hub and the brake mechanism is simultaneously actuated to stop the shaft and the output hub from rotating.

As used herein, the term "magnetic permeance" means the ability to transfer magnetic flux; the term "magnetic reluctance" means the ability to resist the transfer of magnetic flux and is considered to have a reciprocal relationship to magnetic permeance just as the term "resistance" is considered to have a reciprocal relationship with the term "conductance" in relation to the transfer or flow of an electrical current.

These and various other advantages and features of novelty which characterize the present invention are pointed out with particularity in the claims annexed hereto and forming a part hereof. However, for a better understanding of the present invention, its advantages, and other objects obtained by its use, reference should be made to the drawings which form a further part hereof and to the accompanying descriptive matter, in which there is illustrated and described a preferred embodiment of the present invention.

BRIEF DESCRIPTION OF THE DRAWINGS

In the drawings, in which like reference numerals indicate corresponding parts of the preferred embodiment of the present invention throughout the several views.

DETAILED DESCRIPTION OF THE PREFERRED EMBODIMENT

Figure 1:
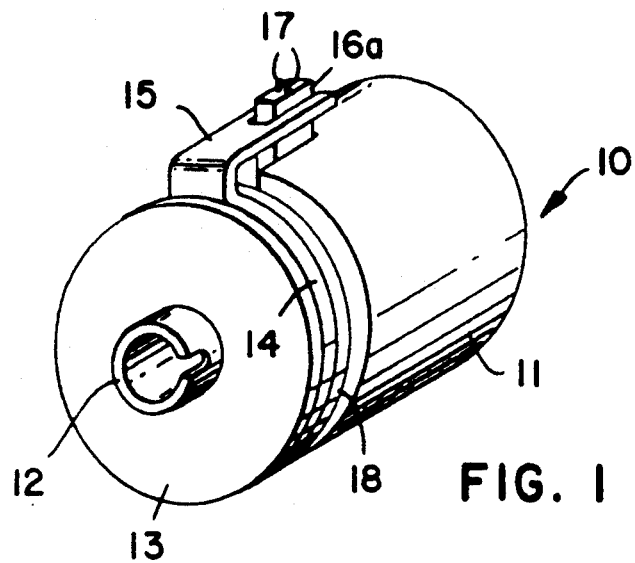
FIG. 1 is a perspective view of a presently preferred miniature form of the clutch and brake mechanism of the present invention.

The clutch and brake mechanism 10 is shown in FIG. 1 to include a cylindrical housing 11 on a tubular shaft 12. In a typical, but non-limiting example, the mechanism shown is approximately 1.5 inches in diameter and 1.5 inches in length.

Figure 3:
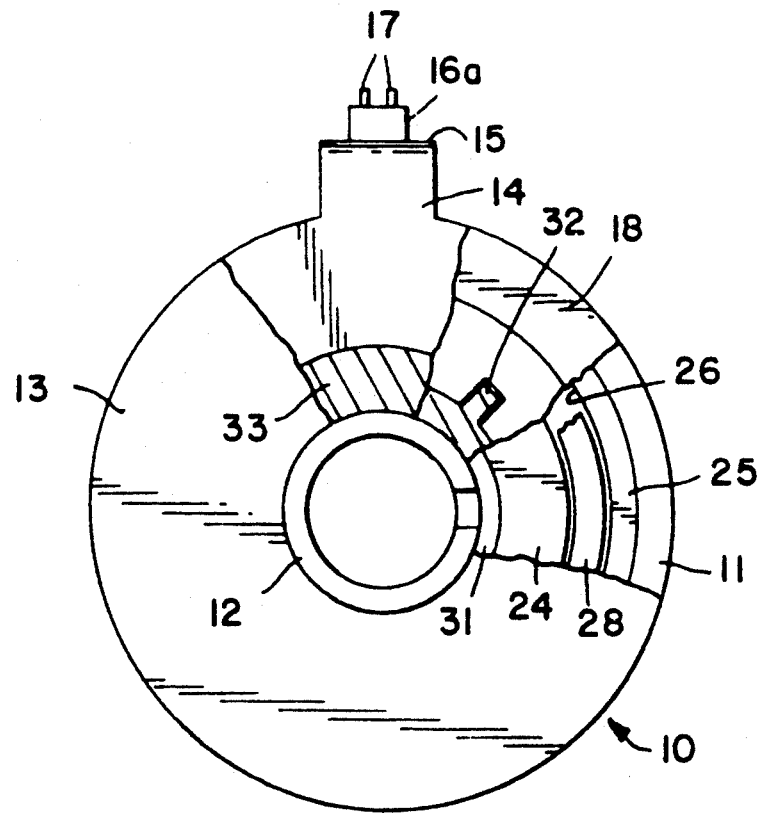
FIG. 3 is an end elevation partially in section and with portions cut away to show detail.
Figure 2:
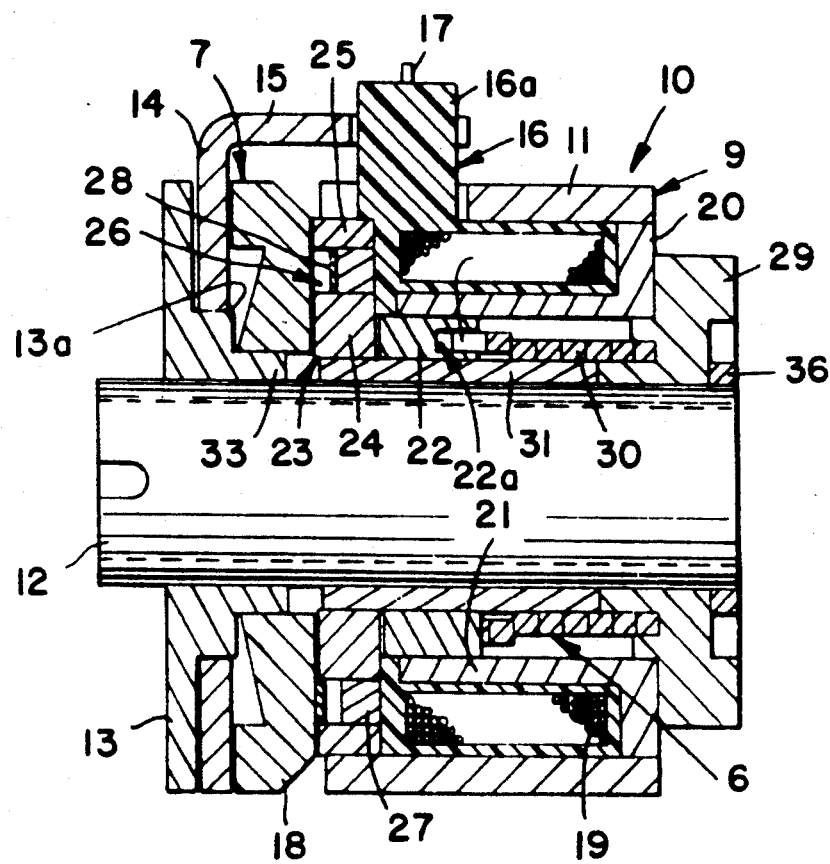
FIG. 2 is a sectional side elevation.

Referring now also to FIGS. 2 and 3, the shaft 12 is engaged with a circular end plate 13. Adjacent to end plate 13 is a friction plate 14 in respect to which the shaft 12 can rotate freely. The friction plate 14 extends radially from an inner ridge 13a of the end plate 13. The friction plate 14 includes an extended forked arm 15 which terminates on both sides of a mounting bracket 16a which forms a portion of an electrical winding unit 16. Connecting wires 17 pass through the electrical winding unit 16 to an electrical winding 19 or coil 19 within the winding unit 16. The winding unit 16 is preferably made of a substantially non-conductive, non-ferromagnetic material such as a plastic material, and is engaged with both the cylindrical housing 11 and an endpiece 20 which are assembled together to form a housing assembly 9. The armature plate 18 serves as a brake control plate which engages the friction plate 14 as part of the brake mechanism 7 when not drawn against the shoulder assembly 23 by a magnetic flux circulating around the coil 19 which is created by an electrical current passing through the coil 19. A wave spring 28 interposed between the shoulder assembly 23 and the armature plate 18 biases the armature plate 18 away from the shoulder assembly 23 and against the friction plate 14 when there is no current passing through the coil 19 and, consequently, no magnetic flux to draw the armature plate 18 up against the shoulder assembly 23 is circulating around the coil 19.

The shoulder assembly 23 includes an inner annular segment 24, which is press fit upon an output hub 31, which is in turn press fit upon the shaft 12 such that shoulder assembly 23 and the output hub 31 turn with the shaft 12. Interposed between the inner annular segment 24 and an outer annular segment 25 of the shoulder assembly 23 is an annular binder 27 which is constructed out of a material which has a significantly lower magnetic permeance than the ferromagnetic materials used to make the inner and outer annular segments 24 and 25 and the armature plate 18. The relative magnetic reluctance, or lack of magnetic permeance, of the annular binder 27, as compared to these other elements, is calculated to urge a magnetic flux which encircles the coil 19, to pass from the inner annular segment 24 to the outer annular segment 25 primarily through the armature plate 18, as opposed to through the annular binder 27 of the shoulder assembly 23. In this way, a current flowing through the coil 19 and creating a magnetic flux around the coil 19, can cause the armature plate 18 to be drawn toward the shoulder assembly 23 by a magnetic attraction created therebetween, thereby compressing the wave spring 28 therebetween, separating the armature plate 18 from the friction plate 14 so that the armature plate 18 can rotate independently of the friction plate 14, and actuating a release of the brake mechanism 7. Alternatively, the annular binder 27 may be replaced by a plurality of discrete spaced apart segments (not shown) which both connect and separate inner and outer annular segments of an alternate shoulder assembly (not shown). These discrete segments (not shown) can be made of any structurally appropriate material, including ferromagnetic materials having a magnetic permeance which is equal to or even greater than that of the inner and outer annular segments and the armature plate, so long as the permeance or flux carrying capacity of the plurality of discrete segments is insufficient to carry the entire flux load such that significant magnetic flux passes from the inner annular segment to the outer annular segment via the armature plate so as to create a magnetic attraction between the armature plate and the alternate shoulder assembly sufficient to compress the wave spring. Furthermore, the alternate shoulder assembly (not shown) can be replaced by a functionally equivalent structure which can be made of a single piece of ferromagnetic material (not shown) in which cutout openings are punched out to form a metal stamping (not shown) having a plurality of cutout openings between, and partially defining, a plurality of alternate spaced apart discrete segments (not shown). It will be appreciated that the size of the cutout openings and the respective alternate spaced apart segments can be adjusted to insure that the alternate spaced apart sements of the metal stamping are incapable of carrying the entire flux load passing from an inner portion (not shown) to an outer portion (not shown) of the metal stamping to complete the alternate magnetic circuit (not shown), so that at least a portion of the flux will pass to the outer portion via the alternate armature plate (not shown), thereby drawning the alternate armature plate up against the metal stamping in a manner analogous to that for the preferred embodiment.

The magnetic flux path or flux circuit of the preferred embodiment, which encircles the coil 19 when an electrical current is passing through the coil 19, passes from the cylindrical housing 11 to the endpiece 20, through an inner axial extension 21 of the endpiece 20 to the wrap spring control ring 22, and then to the inner annular segment 24 of the shoulder assembly 23. Because of the discontinuity between the relative magnetic permeance of the inner annular segment 24 and the annular binder 27, the flux path then continues to the armature plate 18 because this is the path of least magnetic flux impedance or reluctance. The armature plate 18, which is biased away from the shoulder assembly 23 by the wave spring 29 in the absence of magnetic attraction to the shoulder assembly 23 caused by the presence of an operation of a magnetic flux around the coil 19, engages with both the inner and outer annular segments 24 and 25 of the shoulder assembly 23 when a sufficient magnetic flux is created to attract the armature plate 18 to the shoulder assembly 23 and to compress the wave spring 28. This enables the flux path to continue from the inner annular segment 24, through the armature plate 18, to the outer annular segment 25, and then back to the cylindrical housing 11 to complete the magnetic circuit.

The wrap spring clutch mechanism 6 of the clutch and brake mechanism 10 of the present invention operates in an analogous manner to that of the wrap spring clutch disclosed by Wahlstedt (U.S. Pat. No. 4,263,995), the disclosure of which is incorporated herein by reference. When a sufficient electromotive force (EMF) is applied to the coil 19 to create a magnetic flux which completes the magnetic circuit or flux path described above, the control ring 22, which is otherwise freely rotatable around the output hub 31 and the shaft 12, with which the output hub 31 is engaged, the control ring 22 is drawn up against the inner annular segment 24 of the shoulder assembly 23 by the resulting magnetic attraction. This results in sufficient friction between these respective elements of the clutch mechanism 6 to prevent the control ring 22 from rotating independently of the shoulder assembly 23, as well as the output hub 31 and the shaft 12. When this occurs, the wrap spring 30, which is engaged with the control ring 22, is prevented from rotating around the output hub 31, and the wrap spring 30 then wraps down upon the output hub 31, thereby engaging the clutch mechanism 6, so that an input hub 29, which is press fit onto the opposite end of the wrap spring 30, is engaged with the shoulder assembly 23 and the tubular shaft 12 so as to rotate therewith. In this way, the input hub 29 can drive the shaft 12 when the clutch mechanism 6 is so engaged. When the clutch mechanism 6 is released or deactuated by eliminating the EMF and the resulting magnetic flux, the control ring 22 once again turns freely on the output hub 31, and the wrap spring 30 expands out of contact with output hub 31. In this situation, the control ring 22 is no longer drawn up against the shoulder assembly 23 to complete the flux path. At the same time, the armature plate 18 is no longer drawn up against the other side of the shoulder assembly 23 and the wave spring then forces the armature plate 18 against the friction plate 14, thereby actuating the brake mechanism 7 which prevents the shaft 12, the shoulder assembly 23 and the other elements which are engaged therewith, from rotating in respect to the cylindrical housing 11 and the winding unit 16.

It will be appreciated that the input hub 29 is retained on the shaft 12 by a friction ring 36 which is press fit onto the tubular shaft 12 just as the output hub 31 is press fit onto tubular shaft 12. The control ring 22 has recess 22a in which an end portion 30a of the wrap spring 30 is engaged when the wrap spring 30 and the input hub 29 are assembled onto the shaft 12.

A central annular space 26 between the inner and outer annular segments 24,25 of the shoulder assembly 23 is at least partially filled with the annular binder 27 which is preferably made of bronze, stainless steel, or the like, which provide for an annular magnetic or permeance discontinuity in the shoulder assembly 23. It will be appreciated that other materials, such as formable man made materials like epoxy material, so long as this material provides for an annular permeance discontinuity and is otherwise suitable, can also be used. Alternatively, the segments 24,25 may be bound in spaced relationship by spaced narrow segments (not shown) of the same ferromagnetic material used to make the inner and outer segments 24,25, so long as these narrow segments are incapable of carrying sufficient flux density to complete the flux path between the inner and outer annular segments 24,25 such that the magnetic flux does not flow between the inner and outer annular segments 24,25 through the armature plate in sufficient magnitude to result in the compression of the wave spring 28 to actuate the brake release action. The wave spring 28, which biases the armature plate 18 against the friction plate 14, and the friction plate 14 against end plate 13, when the clutch mechanism 6 is disengaged and the flux circuit is incomplete, resides within the remaining annular open space 26. Alternatively, a Belleville spring (not shown) or other biasing spring, suitable for the present use may be substituted.

Input hub 29, together with wrap spring 30 and control ring 22, is free to rotate about shaft 12, unless the clutch mechanism 6 is engaged, and will normally be driven from an external source of torque (not shown). The shoulder assembly 23, together with the hub 31 and the plate 13, are affixed to and rotatable with shaft 12. The armature plate 18 rotates with the end plate 13 and the shaft 12 and is axially slidable along ridges 32 on an axial extension 33 of the end plate 13.

Actuation of the clutch mechanism 6, by application of a suitable electromotive force (EMF) to the coil 19, causes the control ring 22 to be held against the shoulder assembly 23 which results in wrapdown of spring 30 onto the hub 31, and simultaneously causes the armature plate 18 to be held against the shoulder assembly 23, so as to compress the wave spring 28 entirely within the open space 26. On deactuation, the wave spring 28 expands to force plates 13,14 and 18 together in frictional braking contact, while ring 22 is simultaneously freed from contact with the shoulder assembly 23, thereby permitting the wrap spring 30 to expand out of clutching contact with the output hub 31.

Ridges 32 ensure rotation of the armature plate 18 with the rotating shaft 12, but may be eliminated for the sake of simplicity of structure in alternate embodiments. Rigid support of friction plate 14 from the housing 11 similarly permits further simplification by permitting elimination of end plate 13, but with some diminution of braking torque.

The mass of the wave spring 28 is insufficient to exert any appreciable diminution of the magnetic attraction between segments 24,25 of the shoulder assembly 23 and the armature plate 18. The latter is of sufficient mass to retain substantially the entire flow of magnetic flux between segments 24,25 without loss of flux to friction plate 14. The discontinuity in the magnetic permeance in the shoulder assembly 23 results from the fact that the annular binder 27 is constructed of a material or materials calculated to provide less magnetic permeance than the magnetic permeance of the adjacent inner and outer annular segments 24 and 25 and the armature plate 18. It is this lowered magnetic permeance, which results in a magnetic reluctance, which ultimately urges the magnetic flux to pass from the inner annular segment 24 to the outer annular segment 25 primarily via a flux path through the armature plate 18 because this is the path of least reluctance or flux impedance. Therefore, although the annular binder 27, or the space 26 between the inner and outer annular segments 24 and 25, can contain some material which can transfer magnetic flux and/or has ferromagnetic characteristics, a magnetic discontinuity must exist between the inner and outer segments 24 and 25 which is sufficient to urge the transfer of magnetic flux to follow a magnetic flux path including the armature plate 18, as described hereinabove, in sufficient magnitude to draw the armature plate 18 up against the shoulder assembly 23 so that the armature plate 18 is engaged therewith as a result of the magnetic attraction therebetween.

In an alternate embodiment of the present invention, a method of braking a rotary output hub of an electromagnetic wrap spring clutch is provided. The preferred method comprises the steps of: providing the electromagnetic wrap spring clutch, wherein said wrap spring clutch includes a shaft and an input hub in axial alignment with said shaft such that said input hub can freely rotate about the shaft, wrap spring clutch means for engaging and rotationally driving the shaft, said wrap spring clutch means being engaged with said input hub such that rotational force applied to said input hub can rotationally drive the shaft when said wrap spring clutch means are actuated to engage the shaft, friction brake means for generating friction to oppose the rotational movement of the shaft when said brake means are actuated, the rotary output hub being engaged with and rotating with the shaft, said friction brake means including an end piece which is engaged with the shaft and extends radially therefrom, magnetic flux generating means for generating a magnetic flux within the electromagnetic wrap spring clutch when an electromotive force sufficient to generate such a magnetic flux is transferred to said magnetic flux generating means from an external source of electromotive force, electric circuit means interconnected with said flux generating means, wherein said electric circuit means can be closed or opened to respectively connect or disconnect said magnetic flux generating means with the external source of electromotive force, and magnetic flux circuit means for transferring the magnetic flux generated by said magnetic flux generating means, wherein said magnetic flux creates a magnetic attraction between elements of said magnetic circuit when said magnetic flux is generated by said magnetic flux generating means such that said friction brake means and said wrap spring clutch means are simultaneously, and respectively, deactuated and actuated, wherein friction generated by said friction brake means to oppose the rotational movement of the shaft is eliminated and said wrap spring clutch means engage the shaft; providing a source of electromotive force external to said electromagnetic wrap spring clutch which can be electrically interconnected with said magnetic flux generating means by closing said electric circuit means interconnected with said flux generating means; closing said electric circuit means so as to transfer an electromotive force from the external source of electromotive force to said magnetic flux generating means, wherein said friction brake means and said wrap spring clutch means are simultaneously, and respectively, deactuated and actuated; and subsequently opening said electric circuit means so as to simultaneously deactivate said wrap spring clutch means and actuate said friction brake means, wherein said wrap spring clutch means are disengaged from the shaft and said friction brake means generate friction to oppose the rotational movement of the shaft.

It is to be understood, however, that even though numerous characteristics of the present invention have been set forth in the foregoing description, together with details of the structure and function of the invention, the disclosure is illustrative and changes in matters of order, shape, size and arrangement of the parts may be made within the principles of the invention and to the full extent indicated by the broad general meaning of the terms in which the appended claims are expressed.

What is claimed is:

1. A self-braking electromagnetic clutch comprising: a shaft, a driving hub rotatable on said shaft and carrying a wrap spring and a control ring, a driven hub attached to said shaft, a shoulder assembly directly axially adjacent to said control ring extending radially from and rotatable with said driven hub and having ferromagnetic radially inner and outer annular segments separated by binder means having a sufficiently low magnetic permeance in relation to the inner and outer annular segments to create a magnetic permeance discontinuity therebetween, an armature plate adjacent to said shoulder assembly and being axially slidable toward and away from said shoulder assembly, a non-rotatable friction plate axially adjacent to said armature plate, biasing means for biasing said armature plate into frictional contact with said friction plate, and non-rotatable magnetic circuit body means for directing magnetic flux simultaneously between said control ring and said shoulder assembly and between said armature plate and said shoulder assembly.

2. The self-braking electromagnetic clutch of claim 1 further comprising an end plate axially adjacent to said friction plate and rotatable with said shaft.

3. The self-braking electromagnetic clutch of claim 2 wherein said biasing means is a wave spring carried at least partially within said shoulder assembly and adjacent to said binder means.

4. The self-braking electromagnetic clutch of claim 3 wherein said friction plate is supported for limited axial movement but prevented from rotary movement by contact with said body means.

5. A self-braking electromagnetic wrap spring clutch having a wrap spring control ring and a brake control armature plate at separate locations within a common magnetic circuit, wherein a magnetic flux can pass through the magnetic circuit, and wherein all of the magnetic flux can follow a continuous path through both said control ring and said armature plate when passing through said magnetic circuit.

6. A self-braking electromagnetic clutch comprising: a shaft, a driving hub rotatable on said shaft and carrying a wrap spring and a control ring, a driven hub attached to said shaft, a shoulder assembly directly axially adjacent to said control ring extending radially from and rotatable with said driven hub and having ferromagnetic radially inner and outer annular segments separated by connecting means for creating a magnetic permeance discontinuity in said shoulder assembly between the inner and outer annular segments, an armature plate adjacent to said shoulder assembly and being axially slidable toward and away from said shoulder assembly, a non-rotatable friction plate axially adjacent to said armature plate, biasing means for biasing said armature plate into frictional contact with said friction plate and magnetic flux creation means for creating a magnetic flux simultaneously between said control ring and said shoulder assembly and between said armature plate and said shoulder assembly.

7. The self-braking electromagnetic clutch of claim 6 further comprising an end plate axially adjacent to said friction plate and rotatabe with said shaft.

8. The self-braking electromagnetic clutch of claim 6 wherein said biasing means is a wave spring carried at least partially within a recess within said shoulder assembly and adjacent to said connecting means.

9. The self-braking electromagnetic clutch of claim 6 wherein said magnetic flux creation means includes an electric coil.

10. The self-braking electromagnetic clutch of claim 9 further including a housing assembly wherein the magnetic flux passes through a magnetic circuit including said housing assembly, said control ring, said inner annular segment, said armature plate and said outer annular segment, wherein the magnetic flux is urged to pass from the inner annular segment to the outer annular segment through the armature plate because of the lower magnetic permeance of said connecting means as compared to the magnetic permeance of the armature plate.

11. A self-braking electromagnetic clutch comprising: a shaft, a ferromagnetic housing assembly disposed radially about the shaft such that the shaft can freely rotate within the housing assembly, a shoulder assembly extending radially from and being engaged with the shaft, an input hub assembly including an input hub, a wrap spring and a control ring each of which rotates freely about the shaft in the absence of magnetic flux, the wrap spring being affixed to the input hub and engaged with the control ring which is located axially adjacent to the shoulder assembly, a brake mechanism including a friction plate and a brake control plate extending radially from the shaft, the brake control plate being disposed between the friction plate and the shoulder assembly, electric winding means for creating a magnetic flux, said winding means being engaged with the ferromagnetic housing assembly and disposed radially around the shaft which passes at least partially through said housing assembly, the shoulder assembly including a ferromagnetic inner annular segment extending radially from the shaft, the brake mechanism further including biasing means interposed between the shoulder assembly and the brake control plate for biasing the brake control plate against the friction plate.

12. The self-braking electromagnetic clutch of claim 11 wherein said electric winding means include an electric coil for electrical communication with a source of electricity, said electric coil being enclosed within a non-ferromagnetic encasement capable of preventing the transfer of an electric current passing through said electric coil to the ferromagnetic housing assembly engaged with said winding means.

13. A self-braking electromagnetic clutch comprising: a shaft and an input hub in axial alignment with said shaft such that said input hub can freely rotate about the shaft, wrap spring clutch means for engaging and rotationally driving the shaft, said wrap spring clutch means being engaged with said input hub such that rotational force applied to said input hub can rotationally drive the shaft when said wrap spring clutch means are actuated to engage the shaft, friction brake means for generating friction to oppose the rotational movement of the shaft when said brake means are actuated, said friction brake means including an end piece which is engaged with the shaft and extends radially therefrom, magnetic flux generating means for generating a magnetic flux within the self-braking electromagnetic clutch when an electromotive force sufficient to generate such a magnetic flux is transferred to said magnetic flux generating means from an external source of electromotive force, and magnetic flux circuit means for transferring the magnetic flux generated by said magnetic flux generating means, wherein said magnetic flux creates a magnetic attraction between elements of said magnetic circuit when said magnetic flux is generated by said magnetic flux generating means such that said friction brake means and said wrap spring clutch means are simultaneously, and respectively, deactuated and actuated, wherein friction generated by said friction brake means to oppose the rotational movement of the shaft is eliminated and said wrap spring clutch means engage the shaft.

14. The self-braking electromagnetic clutch of claim 13 wherein said friction brake means include a brake control plate and a friction plate which are freely rotatable about said shaft, said friction plate being directly adjacent to said end piece and interposed between said end piece and said brake control plate, said selfbraking electromagnetic clutch further comprising spring biasing means for biasing said brake control plate against said friction plate to generate friction against said end piece to oppose the rotational movement of the shaft when said brake means are actuated, wherein said biasing means force the brake control plate against the friction plate and the friction plate against the end piece in the absence of a magnetic flux which creates a magnetic force acting upon said brake control plate to neutralize the biasing effect of said biasing means upon said brake control plate and thereby deactuate said friction brake means.

15. A method of braking a rotary output hub of an electromagnetic wrap spring clutch; said method comprising the steps of:

(a) providing the electromagnetic wrap spring clutch, wherein said wrap spring clutch includes: a shaft and an input hub in axial alignment with said shaft such that said input hub can freely rotate about the shaft, wrap spring clutch means for engaging and rotationally driving the shaft, said wrap spring clutch means being engaged with said input hub such that rotational force applied to said input hub can rotationally drive the shaft when said wrap spring clutch means are actuated to engage the shaft, friction brake means for generating friction to oppose the rotational movement of the shaft when said brake means are actuated, the rotary output hub being engaged with and rotating with the shaft, said friction brake means including an end piece which is engaged with the shaft and extends radially therefrom, magnetic flux generating means for generating a magnetic flux within the electromagnetic wrap spring clutch when an electromotive force sufficient to generate such a magnetic flux is transferred to said magnetic flux generating means from an external source of electromotive force, electric circuit means interconnected with said flux generating means, wherein said electric circuit means can be closed or opened to respectively connect or disconnect said magnetic flux generating means with the external source of electromotive force, and magnetic flux circuit means for transferring the magnetic flux generated by said magnetic flux generating means, wherein said magnetic flux creates a magnetic attraction between elements of said magnetic circuit when said magnetic flux is generated by said magnetic flux generating means such that said friction brake means and said wrap spring clutch means are simultaneously, and respectively, deactuated and actuated, wherein friction generated by said friction brake means to oppose the rotational movement of the shaft is eliminated and said wrap spring clutch means engage the shaft;

(b) providing a source of electromotive force external to said electromagnetic wrap spring clutch which can be electrically interconnected with said magnetic flux generating means by closing said electric circuit means interconnected with said flux generating means;

(c) closing said electric circuit means so as to transfer an electromotive force from the external source of electromotive force to said magnetic flux generating means, wherein said friction brake means and said wrap spring clutch means are simultaneously, and respectively, deactuated and actuated; and (d) subsequently opening said electric circuit means so as to simultaneously deactuate said wrap spring clutch means and actuate said friction brake means, wherein said wrap spring clutch means are disengaged from the shaft and said friction brake means generate friction to oppose the rotational movement of the shaft.

* * * * *

UNITED STATES PATENT AND TRADEMARK OFFICE
CERTIFICATE OF CORRECTION

PATENT NO. : 5,133,437
DATED : July 28, 1992
INVENTOR(S) : George D. Larson

It is certified that error appears in the above-identified patent and that said Letters Patent is hereby corrected as shown below:

Title page,
In [73] Assignee, after "Manufacturing" please insert --Corporation--.

Title page,
In the abstract, lines 16-17, please change "a way" to --away--.

In column 4, line 1, please change "sements" to --segments--.

In column 4, line 7, please change "drawning" to --drawing--.

In column 7, lines 49-50, please change "non-totatable" to --nonrotatable--.

In column 8, line 26, please change "rotatabe" to --rotatable--.

In column 9, line 45, please change "selfbraking" to --self-braking--.

Signed and Sealed this

Fifth Day of April, 1994

BRUCE LEHMAN

*Attest:*

*Attesting Officer*   *Commissioner of Patents and Trademarks*